United States Patent [19]

Smith et al.

[11] Patent Number: 4,771,521
[45] Date of Patent: Sep. 20, 1988

[54] METHOD AND DEVICE FOR DUAL POSITIONING OF A WORKPIECE IN A TURNING MACHINE

[75] Inventors: Kenneth M. Smith, Chagrin Falls; William H. Rupnik, Mentor; Bryan L. Maxwell, Munson Township, Cuyahoga County; Robert J. Kups, Mayfield Heights, all of Ohio

[73] Assignee: Parker Hannifin Corporation, Cleveland, Ohio

[21] Appl. No.: 115,542

[22] Filed: Oct. 28, 1987

Related U.S. Application Data

[63] Continuation of Ser. No. 6,825, Jan. 23, 1987, abandoned.

[51] Int. Cl.⁴ ............................................. B23B 31/34
[52] U.S. Cl. ....................................... 29/27 R; 279/5; 409/221
[58] Field of Search ..................... 279/5; 29/27 R; 409/198, 221; 51/216 ND; 269/63, 66

[56] References Cited

U.S. PATENT DOCUMENTS

| 2,447,711 | 1/1946 | Mikis | 279/16 |
| 2,839,959 | 2/1956 | Naill et al. | 82/28 |
| 2,957,566 | 9/1958 | Brown | 192/149 |
| 4,008,900 | 2/1977 | Khoshaba | 279/5 |
| 4,411,440 | 10/1983 | Becker | 279/5 |
| 4,416,570 | 11/1983 | Argenbright | 409/222 |

Primary Examiner—Gil Weidenfeld
Assistant Examiner—Steven C. Bishop
Attorney, Agent, or Firm—Christopher H. Morgan

[57] ABSTRACT

A dual position chuck and turning machine method allow automatic shifting of a workpiece from a first to a second turning axis by actuation of a draw bar through the spindle of the turning machine. A linkage in the chuck drives a movable jaw assembly having peripheral fixed keys thereon in an arcuate keyway responsive to the draw bar movement. The arcuate keyway allows moving the workpiece to second axes which are not merely rotations of the jaw assembly.

12 Claims, 3 Drawing Sheets

METHOD AND DEVICE FOR DUAL POSITIONING OF A WORKPIECE IN A TURNING MACHINE

This is a continuation of co-pending application Ser. No. 006,825 filed on 1/23/87 abandoned.

BACKGROUND OF THE INVENTION

A. Field of the Invention

This invention relates in general to machines for turning and milling workpieces, and more particularly, turning machine chucks and methods of positioning workpieces in turning machines.

B. Description of the Prior Art

The history of turning, milling and tapping machines and the art of operating these machines is extensive. As labor costs have increased, it has become increasingly important to reduce the time for changing bits and rechucking workpieces in these machines. These processes are labor intensive. At the same time, consistency and accurate control of the milling, turning and tapping are required. Achieving the goals of reducing operation time while increasing accuracy is a difficult task and much design work has been devoted to it.

One of the most difficult problems in the design and operation of turning machines involves workpieces which must be turned on more than one axis. Of course, in order to machine on a first axis, the workpiece must be positioned in a chuck with the workpiece aligned on the first axis. Since the relation between the first and second axis of turning is usually critical, the first and second positioning operations must be very carefully made. As a workpiece is fixed in the chuck, the workpiece must be carefully aligned and positioned against locator surfaces in the chuck. This is a time consuming operation. Following machining on the first axis, this time consuming manual operation must be performed on the second axis. Thus, a critical second aligning operation must be done by hand and the hand alignment is both slow and less accurate. Further, it is often not easy to provide a single chuck with locator surfaces capable of grasping and precisely aligning the workpiece for both axes. Thus, some dual axis workpieces require two different turning machines or at least two chucks in addition to two manual chuck loading operations.

One attempt to solve this problem involves a rotatable chuck jaw. A workpiece is clamped in position in the chuck jaw and the chuck jaw is then wedged in a first position for turning along a first turning axis of the workpiece. Following the first turning axis operations the chuck rotation is stopped and the chuck jaw is unclamped from the chuck body. The chuck jaw is hingedly connected to the chuck body so that after unclamping it can be manually rotated to a second turning axis position. The jaw is then clamped again. Clamping of the jaw is achieved by a wedge being fixed against flat positioning surfaces on a periphery of the jaw adjacent the hinge between the jaw and chuck body.

Although the rotatable jaw has advantages over manually rechucking the workpiece, it is not possible to use such a rotating jaw when the second turning axis is not merely rotationally-related to the first. For example, if the second turning axis requires that the workpiece be rotated and translated (moved up or down with respect to the axis of the jaw rotation, for example), a rotation of the jaw cannot correctly reposition the workpiece. Further, the rotating chuck still requires manual rotation of the chuck and this means the turning machine must be completely stopped, the machine opened, the jaw unclamped, manually rotated, reclamped, the machine closed, and then reactivated. This is still a time consuming and labor intensive process. This machine and process, therefore, still have not overcome the problem.

SUMMARY OF THE INVENTION

It is accordingly an object of the present invention to provide an improved method and device for dual positioning of a workpiece in a turning machine. It is a further object of the present invention to provide such an improved method and device which does not require a manual operation to achieve the second turning axis position and which can achieve second axis positions which are not merely rotationally related to the first turning axis position or chuck jaw. And a further object of the invention is to provide such a device which is adaptable for achieving a variety of rotational and translational dual axis positions.

Another object of the invention is to provide an improved chuck for use with an automatic turning machine which allows precise realignment of a workpiece in a second turning axis without rechucking the workpiece. The invention provides the chuck with an improved mechanism for achieving this movement.

Yet another object of the present invention is to provide a turning machine method and device which allows dual positioning of the workpiece by means of an automatic draw bar movement.

In accordance with these objects, the present invention provides an improved turning machine with an automatic dual positioning chuck. The turning machine includes a spindle and means for powered rotation of the spindle. It also includes a draw bar extending axially within the spindle and means for automatically axially moving the draw bar between an extended pressure position and retracted pressure position. A chuck body is connected to the spindle for rotation with the spindle. A chuck jaw is held within the chuck body and is movable in the chuck body between first and second secured positions for holding a workpiece in first and second spindle turning axis positions, respectively. A linkage connects the draw bar and the jaw such that movement of the draw bar to the extended pressure position moves the jaw to and holds the jaw at a first secured position and movement of the draw bar to the retracted pressure position moves the jaw to and holds the jaw at the second secured position.

The dual positioning chuck of the present invention includes a chuck body having a pair of facing cam grooves therein. The chuck jaw has means for holding a workpiece therein and a pair of cam followers disposed in the cam grooves of the chuck body. The cam followers and cam grooves are shaped such that when the cam followers are disposed in a first cam position in the grooves, a workpiece is held in the first turning axis position. When the chuck jaw is moved causing the cam followers to move to a second cam position in the cam grooves, a workpiece in the jaw is held in a second turning axis position.

The linkage which connects the draw bar to the chuck jaw preferably includes a rack and pinion for translating the axial motion of the draw bar to rotation of a linkage arm pivotally connected at one end in the chuck body. The other end of the linkage arm is connected by a pivot pin to the chuck jaw. The pivot pin moves in a slot of the linkage arm so that the linkage arm can move the chuck jaw while the cam followers are following the cam grooves. This combination allows the motion of the chuck jaw to achieve dual positioning of a workpiece when the two positions are not merely rotationally related.

For a further understanding of the invention and further objects, features and advantages thereof, reference may now be had to the following description taken in conjunction with the accompanying drawings.

DESCRIPTION OF PREFERRED EMBODIMENTS

Figure 1:
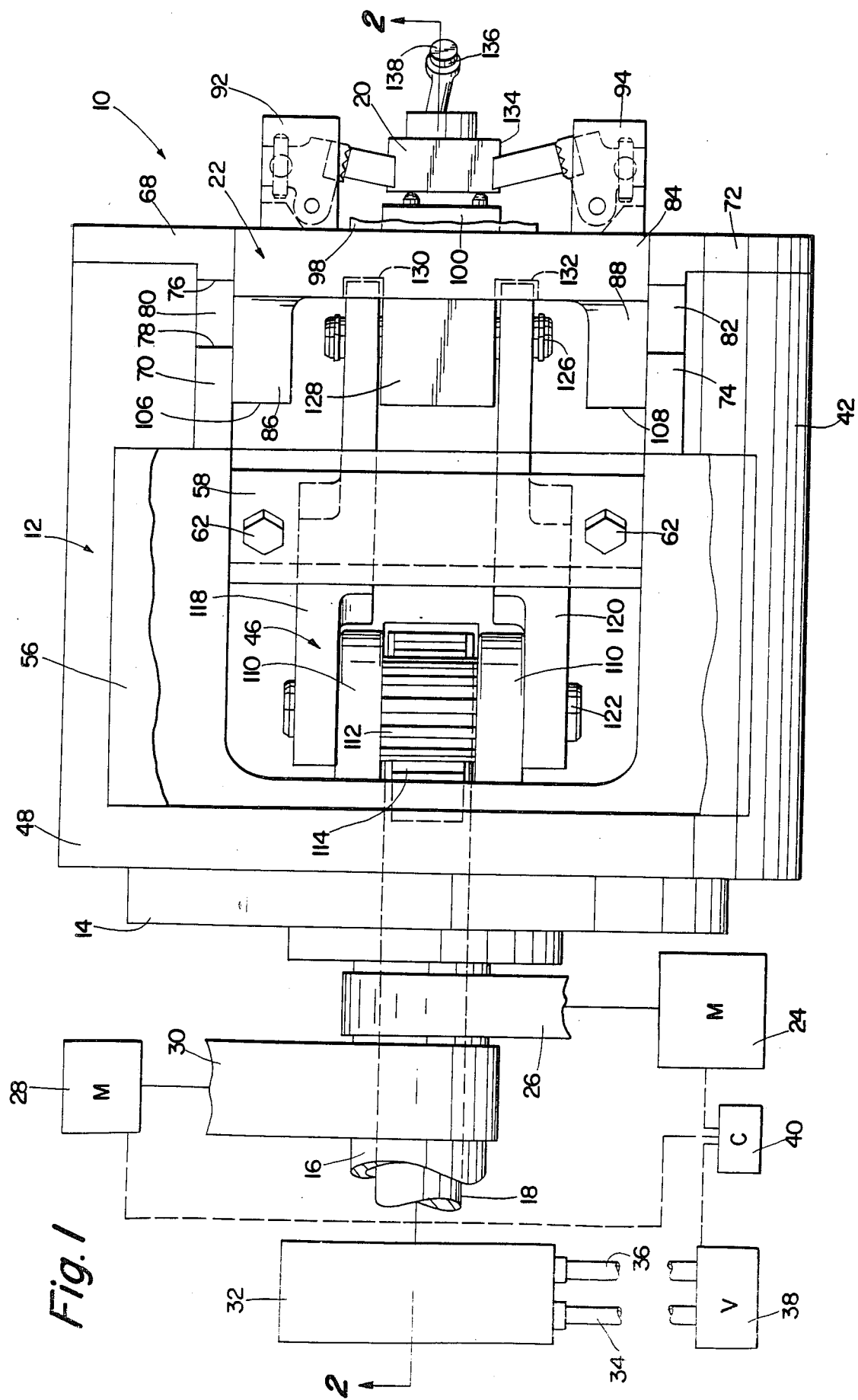
FIG. 1 is a plan view of a turning machine and chuck in accordance with the present invention.

Referring now to FIG. 1, a turning machine constructed in accordance with the present invention is shown generally at 10. The turning machine includes a chuck 12, a spindle 14, a drive shaft 16 and a draw bar 18. A workpiece 20 is held in a jaws assembly 22 of the chuck 12. A drive motor 24 is connected to the drive shaft 16 by a drive belt 26 for rotating the drive shaft 16, spindle 14, chuck 12 and the workpiece 20. Thus, the workpiece 20 is rotated for milling or turning about an axis which extends through the axis of the draw bar 18 and drive shaft 16.

A positioning motor 28 is connected to the drive shaft 16 by a positioning belt 30. When the drive motor 24 is not driving the drive shaft 16 in a turning operation, the positioning motor 28 and positioning belt 30 can be used to orient the workpiece 20 in a precise rotational position for milling or tapping at a desired workpiece location by means of a tool or drill positioned by auxiliary arms or the like (not shown) advanced to the workpiece by conventional turning machine equipment.

The draw bar 18 is axially movable inside the drive shaft 16. An hydraulic actuator 32 is provided on the distal end of the draw bar 18 opposite the proximate or chuck end of the draw bar. The hydraulic actuator 32 serves to axially extend and axially retract the draw bar 18. Hydraulic extension and retraction signals are provided to the hydraulic actuator 32 by hydraulic conduits 34 and 36, respectively. A hydraulic control valve 38 regulates the flow of hydraulic fluid through the conduits 34 and 36 and, thereby, the operation of the hydraulic actuator 32.

An electronic control 40 is connected to the hydraulic control valve 38 and the motors 24 and 28 so that the operation of these devices is automatically monitored and controlled. Preferably, the electronic control 40 can be programmed so that a sequence of operations involving these motors and valves, as well as the advancing and withdrawing of tools to the workpiece 20, can be programmed for automatic operation.

In a conventional turning machine such as a Mazak 10N, a spindle, drive shaft, drive motor, positioning motor, hydraulic actuator and electronic control are provided and configured as shown in FIG. 1. In fact, a conventional turning machine can be altered to the machine of the present invention by using a draw bar and chuck in accordance with the present invention and by reprogramming the electronic control of the turning machine. The electronic control must be reprogrammed since, in a conventional turning machine, the draw bar is axially moved for opening and closing the jaws of the chuck so as to grasp or release a workpiece therein. Accordingly, the program for the electronic control requires that the spindle be motionless and locked before the draw bar can be moved to prevent an accident caused by the workpiece being thrown from the chuck if it were to open while in motion. In the present invention the draw bar serves as a jaw and workpiece position changer and does not serve as a means for grasping or releasing the workpiece.

Figure 2:
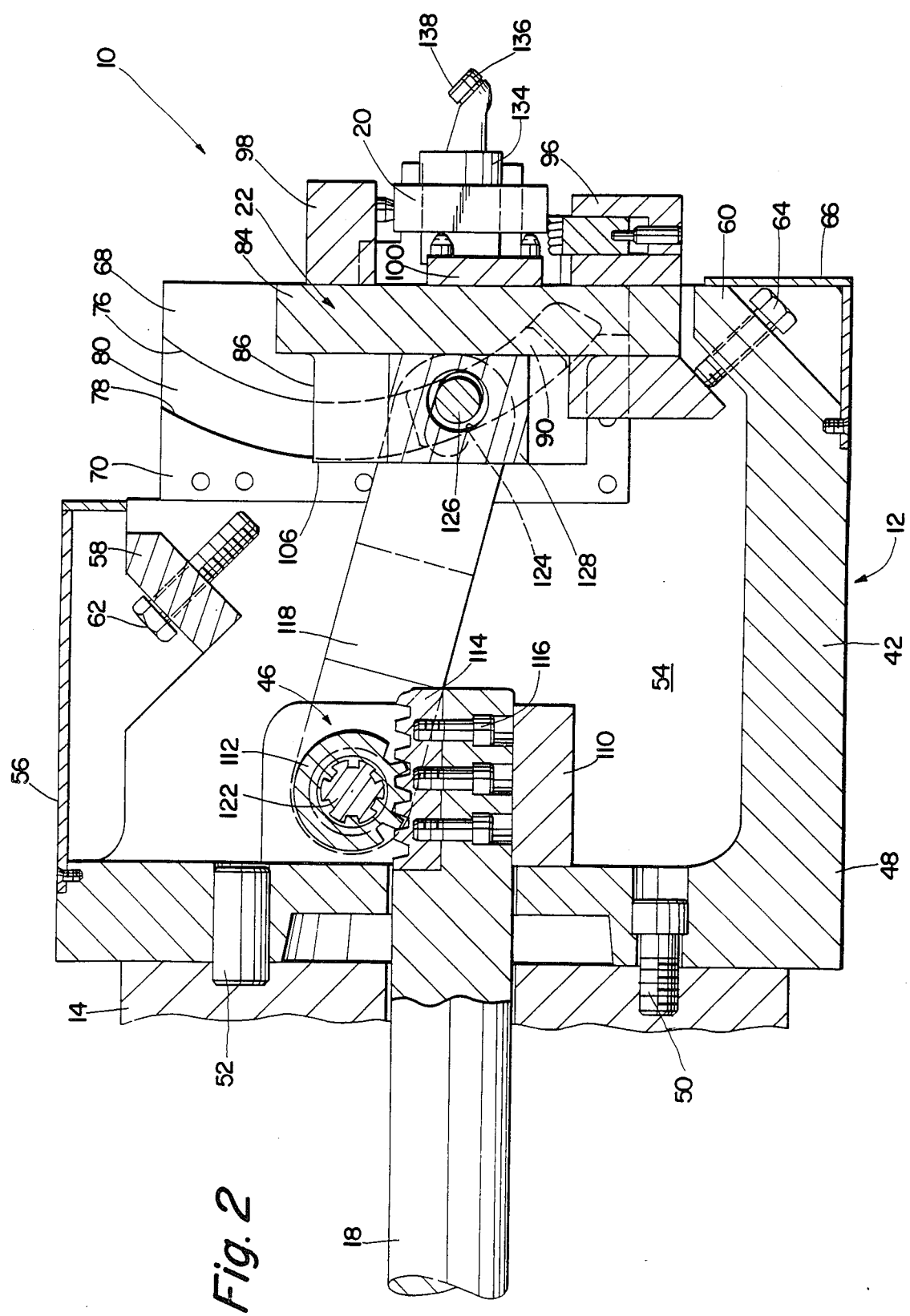
FIG. 2 is a sectional view of the chuck shown in FIG. 1 taken along the lines shown in FIG. 1.
Figure 3:
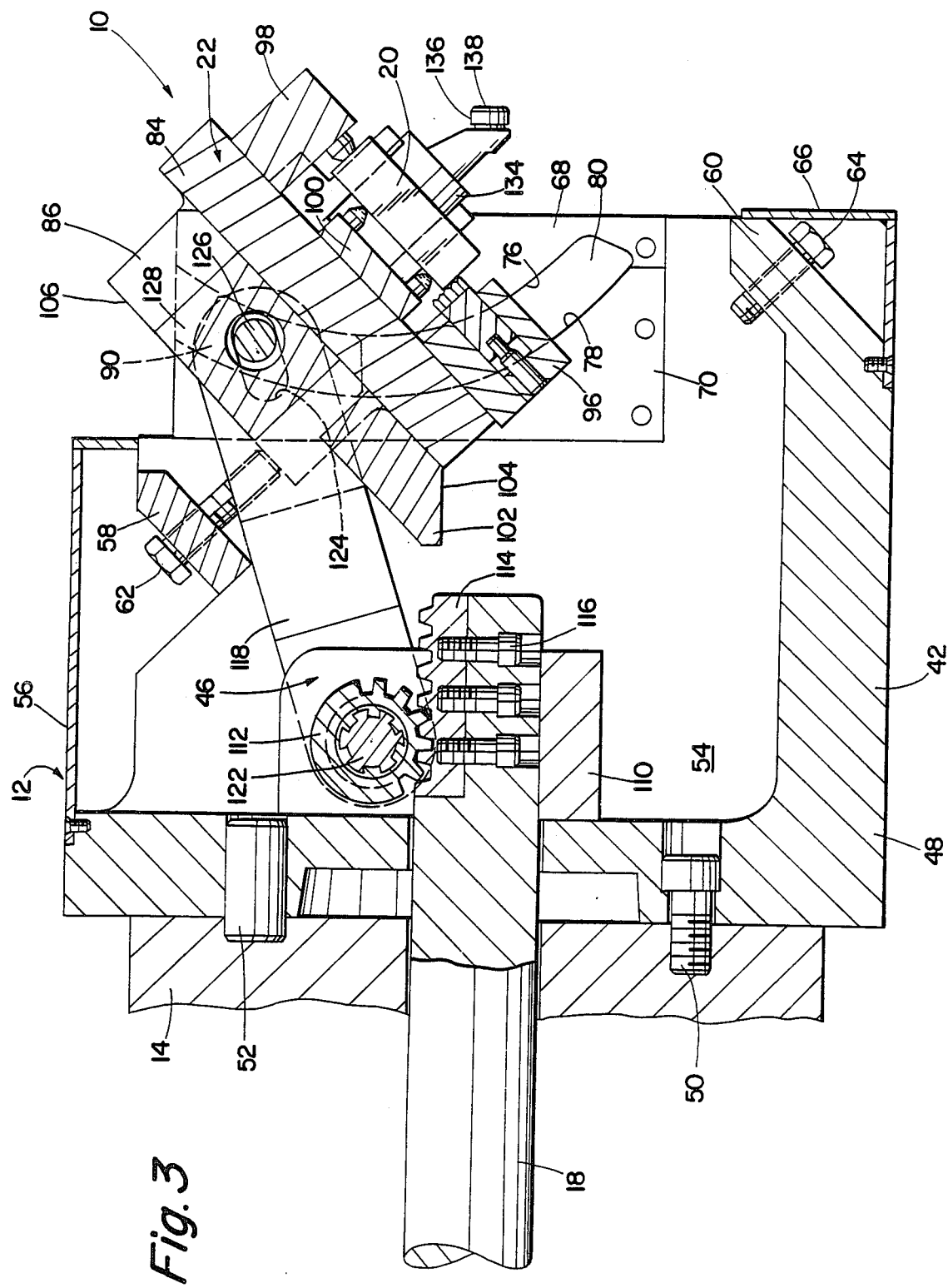
FIG. 3 is a sectional view of the chuck of FIG. 2 in a different mechanical position but taken along the lines as the sectional view of FIG. 2.

Referring now to FIGS. 2 and 3 as well as FIG. 1, the chuck 12 of the present invention is shown. The chuck 12 includes a generally cylindrical body assembly 42, a jaw assembly 22 mounted at the front of the body assembly 42 and a linkage assembly 46 which functionally joins the draw bar 18 to the jaw assembly 22. The rear of the body assembly 42 is attached to the spindle 14 so that it can be driven thereby. The jaw assembly 22 is mounted at the front end of the body assembly 42 and holds the workpiece 20. The linkage assembly 46 is mounted at the inside rear of the body assembly 42 and extends between the draw bar 18 and the jaw assembly 22.

The main portion of the body assembly 42 is a housing 48. The housing 48 is roughly cylindrical on its exterior with a rectangular cavity formed therein. The rear of the housing 48 is attached by screws 50 and locator pins 52 to the front of spindle 14. The rectangular opening 54 in the housing 48 is covered by a covering 56 (the covering 56 is shown partially cut-away in FIG. 1 so that the internal parts can be viewed). A stop bar 58 extends across the top midportion of the opening 54 and a raised lip 60 extends across the bottom front of the opening 54. The stop bar 58 threadedly receives a pair of upper set screws 62 and the raised lip 60 threadedly receives a pair of lower set screws 64. The upper set screws 62 limit the upward travel of the jaw assembly and the lower set screws 64 limit the downward travel of the jaw assembly 22. A front cover 66 extends over the outside of the lower set screws 64.

Facing each other across the side, front of the opening 54 are two pairs of gib plates. The left front gib plate 68 and the left rear gib plate 70 are attached by screws to the left front side of the rectangular opening 54. The right front gib plate 72 and the right rear gib plate 74 are mirror images of the plates 68 and 70 and are attached on the right front side of the opening 54. The left front gib plate 68 has a rearwardly facing convex surface 76 and the left rear gib plate 70 has a frontwardly facing concave surface 78. The surfaces 76 and 78 together form an arcuate cam or keyway 80. A mirror image cam or keyway 82 is formed between the right gib plates 72, 74. The keyways 80 and 82 guide the movement of the jaw assembly between the two operation positions for the workpiece 20 held in the jaw assembly 22.

The jaw assembly 22 includes a base plate 84 with rearwardly extending arms 86 and 88. The arms 86 and 88 and the sides of base plate 84 fit closely within the gib plates 68, 70 on one side and 72, 74 on the other side. The base plate 84 slides within the gib plates as guided by arc-shaped keys or cam followers 90 which are fixedly mounted on the outsides of the arms 86 and 88, respectively, As the jaw assembly 22 is raised or lowered in the chuck 12, it must follow the path of the keyway and will be tilted thereby because of the fixed relationship of the keys 90 on the base plate arms 86 and 88. Fixedly mounted on the front of the base plate 84 are gripper blocks 92, 94 and 96, together with locator blocks 98 and 100 (the locator block 98 is shown cut away in FIG. 1 to allow the other chuck pieces and the workpiece to be more clearly viewed). The locator blocks 98 and 100 have location stubs which serve as contact points for precise positioning of the workpiece 20 as it is being fixed in the jaw assembly. The gripper blocks 92, 94 and 96 have teeth mounted therein which can be adjustably advanced by allen screws to hold the workpiece 20 so that it will not move with respect to the jaw assembly during machining. An allen wrench can thus be used to insert or remove a workpiece from its position in the blocks on the front of base plate 84.

A stop block 102 is mounted at the bottom rear of the base plate 84 between the arms 86 and 88. A positioning surface 104 of the stop block 102 out from the base plate 84 to encounter the lower set screws 64 as the jaw assembly moves downwardly guided by the keyways 80, 82. The location of this positioning surface and the adjustment of the set screws 64 determine the lower stop position of the jaw assembly 22 shown in FIG. 2.

The upper stop position of the jaw assembly 22 shown in FIG. 3 is determined by the upper set screws 62 encountering the rear facing surfaces 106 and 108 of the base plate arms 86 and 88, respectively. Thus, as the jaw assembly 22 moves upwardly as guided by the keyways 80 and 82, the rear facing surfaces 106 and 108 encounter the upper set screws 62, preventing further upward movement.

The gib plates 68, 70 and 72, 74 are attached to the housing 48 by removable screws. Similarly, the keys or cam followers 90 which move in the keyways 80 and 82 are attached to the base plate 84 by removable screws. Accordingly, the keys and keyways can be changed to provide a different positioning of the jaw assembly 22 at either or both of the first or second axis positions. Minor adjustments to these positions can be made by changing the positions of the set screws 62 and 64.

The linkage assembly 46 includes a gearbox 110 fixed to the inside of the rear of housing 48 so that the draw bar 18 can extend therethrough. A pinion or spur gear 112 is mounted for rotation in the upper portion of the gearbox 110. The spur gear 112 meshes with a rack 114 attached to the top of draw bar 18 by screws 116. Thus, the rack and pinion of the linkage 46 convert the rectilinear motion of the draw bar 18 to a rotational motion.

The linkage 46 also includes a pair of linkage arms 118, 120. The rear of the linkage arms 118, 120 are fixed to rotate with the spur gear by a splined shaft 122 which is mounted for rotation in the gearbox 110, but fixes the relative position of the linkage arms 118, 120 and the spur gear 112.

On the ends of the linkage arms 118, 120, opposite the spur gear 112, are provided slots 124. A pivot pin 126 of the jaw assembly 22 is received through the slots 124. The pivot pin 126 is fixed to the base plate 84 of the jaw assembly 22 by a pivot block 128. The pivot block 128 is attached to the center, rear of the base plate 84. Recesses 130, 132 are provided in the base plate 84 to allow the ends of the arms 118, 120 freedom of movement. The slots 124 in the arms 118, 120 allow the pivot pin 126 to move axially with respect to the arms so that the radial motion of the arms need not be followed by the jaw assembly 22 since the jaw assembly 22 must follow the keyways 80, 82.

Depending on the shape of the arcuate keyways and the amount of translational movement of the jaw assembly 22, an imbalance may result in the chuck. The imbalance can be corrected by adding weight at a position which balances the jaw assembly about its two axis positions or minor imbalances can be tolerated if the turning machine characteristics will permit.

When used on a full size automatic turning machine, the housing 48 of the present invention may have a diameter of approximately ten inches and the draw bar may have an axial stroke of approximately one inch. Although these dimensions are not critical to the function of the invention, they indicate the range of motion which is desirable and feasible using the present invention.

In operation, the workpiece 20 is mounted in the gripper and locator blocks 92-100 by manually positioning the workpiece 20 on the location stubs and using an allen wrench to tighten the allen screws so that the teeth of the gripper blocks are moved against and retain the workpiece 20. Motor 24 is then operated by means of the electronic control 40 to drive the spindle 14, and chuck 12. This rotates the workpiece about a first turning axis as shown in FIGS. 1 and 2. The electronic control automatically advances machining tools to perform machining operations on the workpiece 20 in a desired sequence. For example, in the turning operation about the first turning axis, a tool could be advanced automatically to machine the outer collar surface 134 of the workpiece 20.

During the first turning axis operation the draw bar 18 is held in a pressure retracted position by hydraulic actuator 32. This retracted pressure position prevents the jaw assembly 22 from moving by maintaining a downward pressure on the jaw assembly 22 through the linkage assembly 46. This maintains pressure on the stop block 102 which contacts the lower set screws 64 retaining the jaw assembly 22 in a fixed position in the chuck 12.

Once the machining, milling and tapping operations are completed on the first turning axis, the electronic control 40 automatically signals the hydraulic control valve 38 to move the draw bar 18 by the hydraulic actuator 32. This movement can occur while the chuck is rotating and the drive motor 24 remains at full speed. The draw bar 18 then extends to the position shown in FIG. 3. The extension of the draw bar 18 drives the rack and pinion to rotate the linkage arms 118, 120. This raises the jaw assembly 22 which must follow the keyways 80, 82. This results in the desired rotation and translation of the jaw assembly 22 and the workpiece 20 held therein. The upward movement of the nozzle assembly 22 is stopped by the rear facing surfaces 106, 108 of the base plate arms 86, 88 encountering the upper set screws 62, 64. The draw bar 18 retains the upward pressure on the jaw assembly 22 by the hydraulic actuator 32. This retains the jaw assembly in its upper position and prevents movement of the jaw assembly and its workpiece 20 while it is being machined in the second turning axis position shown in FIG. 3.

Following the movement of the workpiece 20 to the second turning axis position, the electronic control 40 automatically actuates the advancement of tools to operate on the workpiece 20. For example, tools could be automatically advanced to machine the nozzle periphery 136 and nozzle orifice 138.

Following the automatic turning operations at the second turning axis position of the workpiece 20, the electronic control 40 causes the draw bar 18 to be retracted to the first turning axis position shown in FIGS. 1 and 2 as the motor 24 is deactivated halting the driving of the chuck 12. The positioning motor 28 can then be actuated to position the chuck in readiness for removal of the workpiece 20 and insertion of a new workpiece. With the chuck automatically stopped and locked, a manual operation of removing the workpiece by loosening the allen screws on the gripper blocks can be performed removing the completed workpiece 20. The chuck and machine are then in readiness for repeating the operation on a new workpiece.

As can be seen, the present invention allows automatic repositioning of dual axis workpieces saving a considerable amount of manual time which would otherwise be required for rechucking the workpiece. Moreover, the present invention is precisely accurate in the repositioning because of the closely machined and adjustable features of the present invention.

Thus, the present invention is well adapted to achieve the objects and advantages mentioned as well as those inherent therein. It will be appreciated that the instant specification and claims are set forth by way of illustration and not of limitation, and that various changes and modifications may be made without departing from the spirit and scope of the present invention.

We claim:

1. A chuck for use with an automatic turning machine of the type having a turning spindle with a draw bar axially disposed therein which is axially movable to first and second pressure positions, comprising
    a chuck body fixably attachable to the spindle;
    a chuck jaw for holding a workpiece therein, said jaw being movable in said chuck body between first and second secured positions for holding a workpiece in first and second spindle turning axis positions, respectively; and
    linkage means for connecting the draw bar and said jaw such that movement of the draw bar to the first pressure position moves and holds said jaw at said first secured position and movement of the draw bar to the second pressure position moves and holds said jaw at said second secured position.

2. The chuck of claim 1 wherein said chuck jaw has a pair of keys disposed on opposite sides of said chuck jaw and wherein said chuck body has a pair of arcuate keyways in which said keys are received for sliding therein so as to allow said chuck jaw to move in said chuck body between said first and second positions.

3. The chuck of claim 1 wherein said arcuate keyways are shaped so that said first and second spindle turning axis positions of said workpiece are not merely rotationally related.

4. The chuck of claim 3 wherein said chuck body and said chuck jaw have mating, adjustable stop means for adjustably limiting the relative motion of said chuck jaw in said chuck body to define said first and second secured positions.

5. The chuck of claim 4 wherein said mating adjustable stop means comprise first and second set screws threadedly received in said chuck body, said first set screw defining said first secured position and said second set screw defining said second secured position.

6. The chuck of claim 3 wherein said linkage means comprises a rack for mounting on the draw bar, a pinion received on said rack for movement thereby, and a linkage arm connected on one end to said pinion and on the other end to said chuck jaw.

7. The chuck of claim 6 wherein said chuck jaw includes a pivot pin to which said linkage arm is attached and wherein said linkage arm has a slot therein which receives said pivot pin so that said pivot pin can rotate within and move along the length of said slot as said chuck jaw keys move in said arcuate keyways between said first and second secured positions of said chuck jaw.

8. An improved method of moving a workpiece in an automatic turning machine from a first turning axis position to a second turning axis position without rechucking the workpiece, comprising automatically moving a turning machine draw bar so as to actuate a chuck jaw linkage to move a chuck jaw holding the workpiece from first secured position holding the workpiece in said first turning axis position to a second secured position holding the workpiece in said second turning axis position.

9. The improved method of claim 8 wherein said moving step comprises moving said chuck jaw in an arc so that said first and second turning axis positions of said workpiece are not merely rotationally related.

10. The improved method of claim 9 wherein said step of moving said chuck jaw in an arc comprises axially moving said draw bar and converting said axial movement to an arcuate movement of said chuck jaw by means of a rack and pinion linkage.

11. An improved turning machine with an automatic dual positioning chuck, comprising
    a spindle;
    means for powered rotation of said spindle;
    a draw bar extending axially within said spindle;
    means for automatically axially moving said draw bar between an extended pressure position and a retracted pressure position;
    a chuck body connected to said spindle;
    a chuck jaw for holding a workpiece therein, said jaw being movable in said chuck body between first and second secured positions for holding a workpiece in first and second spindle turning axis positions, respectively; and
    linkage means connecting the draw bar and said jaw such that movement of the draw bar to the extended pressure position moves and holds said jaw at said first secured position and movement of the draw bar to the retracted pressure position moves and holds said jaw at said second secured position.

12. A dual position chuck for dual positioning of a workpiece held therein, comprising:
    a chuck body having a pair of facing cam grooves therein;
    a chuck jaw for holding a workpiece therein and having a pair of cam followers disposed in said cam grooves, said cam grooves and cam followers being shaped such that when said cam followers are disposed in a first cam position in said cam grooves a workpiece in said jaw is held in a first turning axis position and when said cam followers are disposed in a second cam position in said cam grooves a workpiece in said jaw is held in a second turning axis position which is not merely rotationally related to said first turning axis position; and
    means for moving said chuck jaw between said first and second cam positions.

* * * * *